United States Patent
Lindoff et al.

(10) Patent No.: US 7,149,538 B2
(45) Date of Patent: Dec. 12, 2006

(54) WIRELESS TRANSCEIVERS, METHODS, AND COMPUTER PROGRAM PRODUCTS FOR RESTRICTING TRANSMISSION POWER BASED ON SIGNAL-TO-INTERFERENCE RATIOS

(75) Inventors: Bengt Lindoff, Bjarred (SE); Bo Bernhardsson, Lund (SE); Torgny Palenius, Loddekopinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 474 days.

(21) Appl. No.: 10/612,373

(22) Filed: Jul. 2, 2003

(65) Prior Publication Data
US 2005/0075122 A1    Apr. 7, 2005

Related U.S. Application Data

(60) Provisional application No. 60/447,238, filed on Feb. 13, 2003.

(51) Int. Cl.
*H04Q 7/20* (2006.01)
*H04B 7/00* (2006.01)

(52) U.S. Cl. ........................................ 455/522; 455/69

(58) Field of Classification Search ................ 455/522, 455/78, 88, 553.1, 92, 95, 115.3, 134, 226.2, 455/69, 68, 70, 13.4, 127.1
See application file for complete search history.

(56) References Cited

U.S. PATENT DOCUMENTS

| | | | |
|---|---|---|---|
| 6,185,432 B1 | 2/2001 | Vembu | 455/522 |
| 6,456,826 B1 * | 9/2002 | Toskala et al. | 455/63.1 |
| 2001/0026544 A1 | 10/2001 | Miura | 370/335 |
| 2002/0136186 A1 | 9/2002 | Watanabe | 370/343 |
| 2002/0159514 A1 | 10/2002 | Miyoshi et al. | 375/226 |
| 2002/0196879 A1 * | 12/2002 | Iochi | 375/346 |
| 2003/0022685 A1 | 1/2003 | Nilsson | 455/522 |
| 2003/0039217 A1 | 2/2003 | Seo et al. | 370/318 |

FOREIGN PATENT DOCUMENTS

| | | | |
|---|---|---|---|
| EP | 0 917 302 A1 | | 5/1999 |
| EP | 1139685 | | 10/2001 |
| GB | 2373135 | * | 9/2002 |
| WO | WO 02/17531 | | 5/2001 |
| WO | WO 02/41523 A2 | | 5/2002 |
| WO | WO0241523 | * | 5/2002 |

OTHER PUBLICATIONS

*Universal Mobile Telecommunications System (UMTS); UE Radio Transmission and Reception (FDD);* 3GPP TS 25.101 Version 4.0.0 Release 4); ETSI TS 125 101 V4.0.0 ; pp. 1-68; (Mar. 2001).
European Search Report File No.: RS 110028 US, dated Oct. 31, 2003.
Yoon et al; *Adaptive SIR Estimation in WCDMA Systems*; Mar. 2002 IEEE, pp. 275-279.

* cited by examiner

*Primary Examiner*—Nay Maung
*Assistant Examiner*—Dominic E. Rego

(57) ABSTRACT

A method for controlling transmission power from a wireless transceiver. Signal to interference ratios (SIRs) are estimated for a signal that is received from another wireless device. An out-of-sync condition between the wireless transceiver and the other wireless device is identified based on the SIRs. Change of the transmission power from the wireless transceiver is restricted based on the SIRs and when an out-of-sync condition has not been identified.

32 Claims, 2 Drawing Sheets

WIRELESS TRANSCEIVERS, METHODS, AND COMPUTER PROGRAM PRODUCTS FOR RESTRICTING TRANSMISSION POWER BASED ON SIGNAL-TO-INTERFERENCE RATIOS

CROSS-REFERENCE TO PROVISIONAL APPLICATION

This application claims the benefit of provisional Application No. 60/447,238, filed Feb. 13, 2003, entitled Fast Out-Of-Synch Detector For WCDMA, the disclosure of which is hereby incorporated herein by reference in its entirety as if set forth fully herein.

FIELD OF THE INVENTION

The invention disclosed and claimed herein generally relates to wireless transceivers and methods for estimating the signal-to-interference ratios (SIRs) of received signals, and more particularly to restricting changes that are allowed to the transmission power based on the SIR.

BACKGROUND OF THE INVENTION

Power control is important for capacity and efficiency in code division multiple access (CDMA) communication systems. For example, if a mobile terminal is located close to a base station, the power level of signals transmitted from the mobile terminal to the base station, in the absence of power adjustment, would be comparatively high. This could interfere with transmissions from other mobile terminals located farther from the base station. Conversely, the power level of signals transmitted from a mobile terminal which is located far from the base station, in the absence of power adjustment, could be comparatively weak. Accordingly, some communication systems, including, for example, wideband CDMA (WCDMA) systems, provide a transmission power control (TPC) command by which a base station can adjust the transmission power of a mobile terminal.

Power control can involve the base station estimating the signal-to-interference ratios (SIRs) of received signals, such as, for example, received pilot symbols in a CDMA system. If the SIRs of a received signal are lower than a threshold value, a command or adjustment signal is sent to the transmitting mobile terminal to increase its transmission power. The command is sent on the reverse link, i.e. the down link. When the estimated SIRs are higher than the threshold value, a command to decrease transmission power is sent by the base station to the transmitting mobile terminal. Base station transmission power may also similarly be controlled by the mobile terminal.

In some communication systems, such as 3rd Generation Partnership Project (3GPP) standard communications systems, a mobile terminal should stop transmitting when the quality of the signal received from a transmitting base station falls below a threshold synchronization value, which may indicate that the mobile terminal has become out-of-sync with the transmitting base station. Accordingly, detection of when the mobile terminal is in-sync or out-of-sync with a transmitting base station can be important to avoid unnecessarily dropping calls, or conversely, to avoid continuing to transmit and possibly degrade the capacity of the base station after the mobile station can no longer effectively communicate with the base station.

According to the 3GPP standard, a mobile terminal is considered to have become out-of-sync, and therefore should stop transmitting, when the Dedicated Physical Channel Signal to Interference Ratios (DPCH-SIR), averaged over 160 milliseconds, is below a threshold value. The 3GPP standard also provides that a mobile terminal is considered to be in-sync, and may transmit, when the DPCH-SIR, averaged over 160 milliseconds, is above a threshold value. A further explanation of this requirement is provided by the 3*rd Generation Partnership Project; Physical Layer Procedures (FDD)*, 3GPP TS 25.101, chapter 6.4.4, (2002–06), 2002, and by the 3*rd Generation Partnership Project; Physical Layer Procedures (FDD)*, 3GPP TS 25.214, chapter 4.3.1.2, (2002–06), 2002.

SUMMARY OF THE INVENTION

Various embodiments of the present invention provide a method for controlling transmission power from a wireless transceiver. Signal to interference ratios (SIRs) are estimated for a signal that is received from another wireless device. An out-of-sync condition between the wireless transceiver and the other wireless device is identified based on the SIRs. The other wireless device may, for example, be a base station or a mobile terminal. Changes to the transmission power from the wireless transceiver are restricted based on the SIRs and when an out-of-sync condition has not been identified. Restricting increase of the transmission power may avoid or prevent the wireless transceiver from unnecessarily increasing or spiking its transmission power, and possibly interfering with communications between other communication devices, after it may have lost its ability to effectively communicate with the other wireless device. On the other hand, restricting a decrease of the transmission power may avoid an unnecessarily dropped connection.

DETAILED DESCRIPTION

Figure 1:
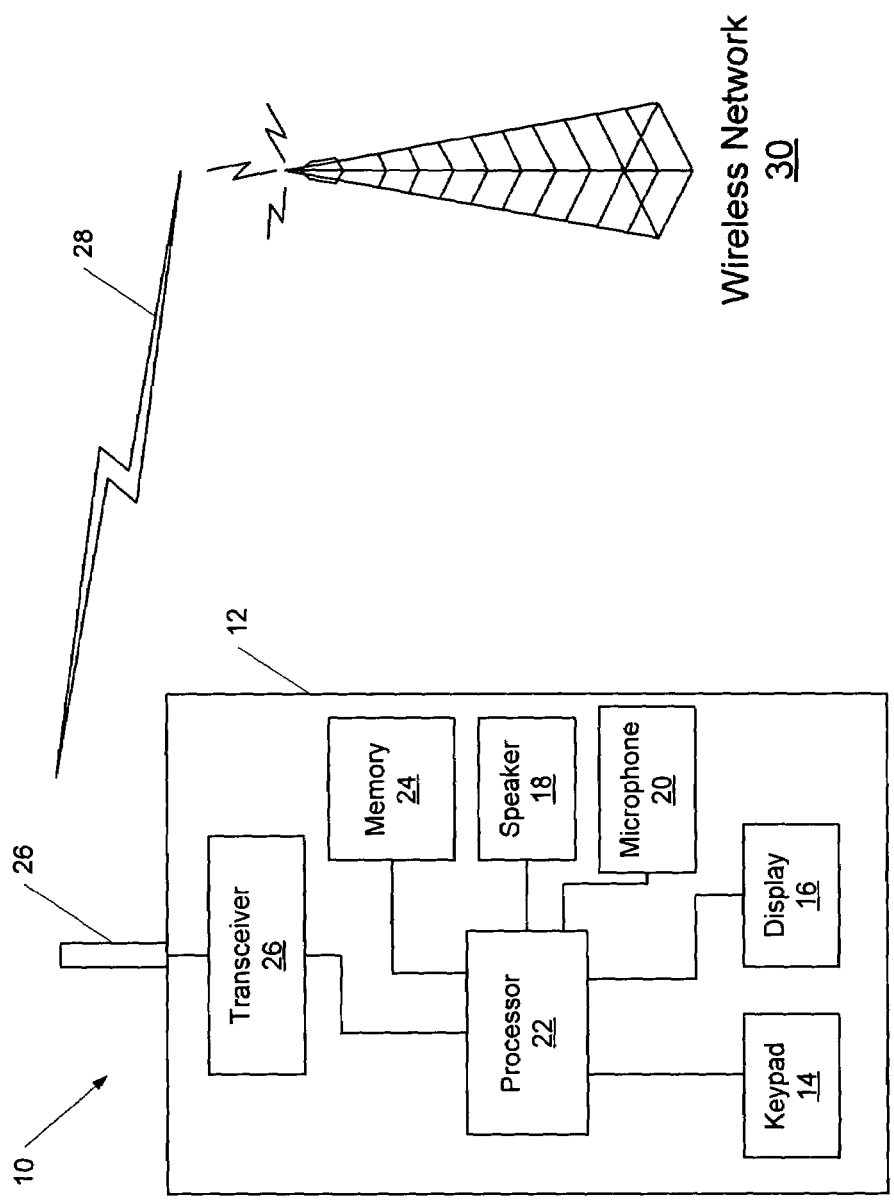
FIG. 1 illustrates a block diagram of a wireless communication system according to some embodiments of the present invention.

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and mobile terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, and/or other programmable data processing apparatus in a mobile terminal, such that the instructions, which execute via the processor of the computer and/or other programmable data processing apparatus, create means for implementing the functions/acts specified in the block diagrams and/or operational block or blocks.

These computer program instructions may also be stored in a computer-readable memory that can direct a mobile terminal to function in a particular manner, such that the instructions stored in the computer-readable memory produce an article of manufacture including instructions which implement the functions/acts specified in the block diagrams and/or operational block or blocks. It should also be noted that in some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Various embodiments of the present invention will now be described with reference to the schematic block diagram of FIG. 1 that illustrates an exemplary wireless communication system that includes a mobile terminal 10 that communicates with a wireless communications network 30 over a radio frequency communication channel 28. For purposes of illustration only, the wireless communication system is assumed to be a WCDMA system that is compliant with the 3GPP specification.

The mobile terminal 10 controls its transmission power over the communication channel 28 in response to a transmission power control (TPC) command from the network 30. The mobile terminal 10 also controls its transmission power based on the quality of signals received from the network 30. For example, the mobile terminal 10 may stop transmitting when received signal quality falls below a threshold level, which may indicate that the mobile terminal is out-of-sync or that it otherwise may not be able to effectively communicate with the network 30. The mobile terminal 10 may determine signal quality by estimating signal to interference ratios (SIRs) from pilot signals received from the network 30. When the estimated SIRs fall below a threshold value, which may indicate an out-of-sync condition, the mobile terminal 10 stops transmitting, and may thereby avoid interfering with communications between the network 30 and other mobile terminals. Conversely when the estimated SIRs exceed the threshold value, the mobile terminal 10 may begin and/or resume transmission.

The mobile terminal 10 may remove bias from the SIR estimates according to the various embodiments of the present invention, which may allow more accurate detection of the out-of-sync and/or in-sync condition. The mobile terminal 10 may also restrict or prevent an increase and/or decrease of its transmission power based on the SIRs and when an out-of-sync condition has not been identified. For example, when the received signal quality (represented by the estimated SIRs) is below a threshold amount, but the mobile terminal 10 determines that it is in-sync such that it can continue transmitting, the mobile terminal 10 may ignore, or may modify its reaction to, a received TPC command that commands an increase or decrease in transmission output power. For example, restricting or preventing an increase in transmission output power may avoid or prevent the mobile terminal 10 from unnecessarily interfering with communications between the network 30 and other mobile terminals when the mobile terminal 10 is uncertain about whether the channel conditions are sufficient to continue communication with the network 30. Similarly, restricting decrease in the transmission output power may avoid unnecessarily dropping calls.

As illustrated in FIG. 1, the mobile terminal 10 may include a portable housing 12, a keyboard/keypad 14, a display 16, a speaker 18, a microphone 20, a processor 22, a memory 24, and a transceiver 26. The memory 24 may include one or more erasable programmable read-only memories (EPROM or Flash EPROM), battery backed random access memory (RAM), magnetic, optical, or other digital storage device, and may be separate from, or at least partially within, the processor 22. The mobile terminal 10 may, thereby, communicate with the network 30 using radio frequency signals. The radio frequency signals may be communicated through an antenna 26 over the communication channel 28 with the network 30.

As used herein, a "mobile terminal" includes, but is not limited to, a cellular mobile terminal; a personal communication terminal that may combine a cellular mobile terminal with data processing, facsimile and data communications capabilities; a personal data assistance (PDA) that can include a wireless transceiver, pager, Internet/intranet access, local area network interface, wide area network interface, Web browser, organizer, and/or calendar; and a computer or other device that includes a wireless transceiver. The mobile terminal 10 may be configured to communicate according to one or more wireless communication protocols, including, but not limited to, ANSI-136, GSM, code division multiple access (CDMA), wideband-CDMA, CDMA2000, Enhanced Data Rates for GSM Evolution (EDGE), Universal Mobile Telecommunications System (UMTS), a wireless local area network (WLAN) protocol, including IEEE 802.11b-g, and Bluetooth, satellite protocols, private land mobile radio protocols, including PROJECT-25 and Tetra, and/or other communication protocols. Communication protocols as used herein may specify the information communicated, the timing, the frequency, the modulation, and/or the operations for setting-up and/or maintaining a communication connection.

Figure 2:
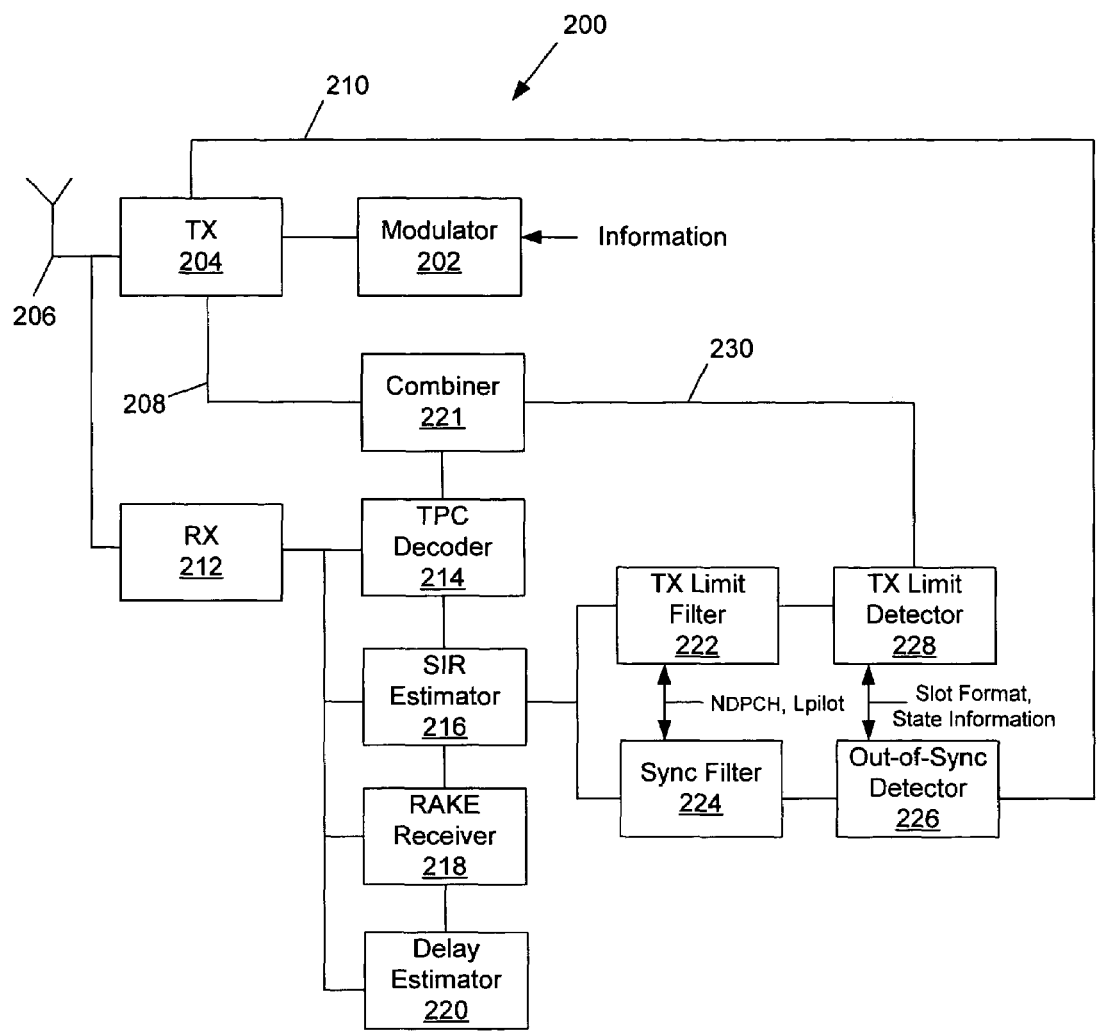
FIG. 2 illustrates a block diagram of a transceiver according to some embodiments of the present invention.

FIG. 2 illustrates a transceiver 200 that may, for example, be used in the mobile terminal 10 shown in FIG. 1 according to various embodiments of the present invention. Information that is to be transmitted may be modulated by a modulator 202 and transmitted by a transmitter 204 through an antenna 206. The transmitter 204 controls its output transmission power based on a power level signal 208 from a combiner 221, and stops transmitting (reduces its transmission power to a very low value or substantially zero) based on a transmission enable signal 210 from an out-of-sync detector 226.

Signals from the antenna 206 are received by a receiver 212 where they are downconverted and sampled, and then coupled to a transmit power control (TPC) decoder 214, a SIR estimator 216, a RAKE receiver 218, and a delay estimator 220. The RAKE receiver 218 has L delay taps or RAKE fingers. The delay estimator 220 estimates RAKE delays from the sampled received signal. The SIR estimator 216 forms channels estimates ($h_i$, where i=1 to L) for the L delay taps of the RAKE receiver 218 using, for example, a common pilot channel (CPICH) from the network 30. The channel estimates are coupled to the Rake receiver 218 for combining with the received sampled signal, and are coupled to the TPC decoder 214. The TPC decoder decodes the received sampled signal to identify a TPC command from the network 30, and uses the TPC command to generate a control signal, which is coupled through the combiner 221 to the transmitter 204, to control the output transmission power of the transmitter 204. Accordingly, the network 30 may transmit a TPC command to the transceiver 200 to control its output transmission power.

The SIR estimator 216 also generates an estimate of interference in the received signal. The interference may be estimated using the CPICH, and may then be transformed to an estimate of the interference in the dedicated physical channel (DPCH) using a spreading factor difference between the CPICH and the DPCH. An estimate of the dedicated signal power may be made using, for example, dedicated pilot channel symbols. Signal to interference ratios (SIRs) may then be estimated using the estimated interference for the DPCH and the estimated dedicated signal power. The SIR estimates are coupled to a TX limit filter 222 and a sync filter 224. The TX limit filter 222 and the sync filter 224 can remove at least a portion of bias in the SIR estimates based upon the number of dedicated pilot channel symbols ($N_{DPCH}$) that are used for channel estimation and/or the number of RAKE fingers used to estimate the SIRs, as will be discussed later herein with regard to further embodiments of the filters. NDPCH may be known based on the slot format of the data channel 28 which is provided by the network 30 during the setup of the connection.

The sync filter 224 generates a filtered SIR signal by, for example, averaging and/or integrating the SIR estimates over a predetermined time. The filtered SIR signal is compared by the out-of-sync detector 226 to an out-of-sync threshold. When the filtered SIR signal is below, or satisfies, the out-of-sync threshold, the out-of-sync detector 226 determines that an out-of-sync condition has occurred and substantially reduces the output transmission power of the transmitter 204 to, for example, about zero. Accordingly, the transmitter 204 may be substantially turned-off when an out-of-sync condition is detected.

The transmit (TX) limit filter 222 may operate similar to the sync filter 224, except that it may have a faster response to rapid changes in the SIRs. Accordingly, an abrupt decrease in the received SIR may be indicated earlier by the filtered SIR signal from the TX limit filter 222 than by the filtered SIR signal from the sync filter 224. A TX limit detector 228 compares the filtered SIR signal from the TX limit filter 222 to a TX limit threshold. When the filtered SIR signal is below, or satisfies, the TX limit threshold, the TX limit detector 228 restricts or prevents changes in the transmission output power of the transmitter 204.

In an example operation, when the SIR estimates abruptly decrease, but an out-of-sync condition has not yet been detected by the out-of-sync detector 226, the TX limit detector 228 may restrict the transmission power of the transmitter 204 to limited changes and/or may essentially latch (e.g., freeze) the transmission power to a power level, such as a current or previous power level. The transmission power level may be latched by, for example, using a limit signal 230 to latch the output power level signal 208 from the combiner 221 to the power level associated with a current TPC command or an earlier TPC command, such as a TPC associated with an earlier slot. Consequently, when the channel signal quality has degraded to where a TPC from a network may be incorrectly interpreted or when the transceiver 200 may otherwise be prone to incorrectly increasing and/or decreasing its transmission power, the transmission power may be restricted to limited changes and/or latched to a power level to preclude such incorrect increase or decrease.

The output transmission power level may continue to be restricted to limited changes and/or latched until the signal quality sufficiently improves as determined by the TX limit detector 228, or until the signal quality sufficiently degrades so that the transmitter is essentially turned-off by the out-of-sync detector 226.

The threshold values used by the TX limit detector 228 and/or the out-of-sync detector 226 may be based on a desired sensitivity of the transceiver 200 to signal quality conditions where transmission power changes should be restricted or where transmission power should be reduced to about zero.

Bias or error between the estimated SIRs and the actual SIRs (for example between the mean of the estimated SIRs and the actual SIRs) may be at least partially removed by a bias removal module that may be part of the TX limit filter 222 and/or the sync filter 224. Removing bias from the filtered SIR estimates may improve the ability of the TX limit detector 228 and/or the out-of-sync detector 226 to more accurately and/or quickly detect signal quality conditions in which the transmission power should be restricted or turned-off, which may be particularly advantageous for low SIR values. The TX limit filter 222 and the sync filter 224 may remove at least a portion of bias in the SIR estimates based upon the number of dedicated pilot channel symbols ($N_{DPCH}$) that are used for channel estimation and/or the number of RAKE fingers that are used to estimate the SIRs.

Bias may be estimated and at least partially removed from the estimated SIRs as described below. With reference to DPCH channel estimation, the de-spread, with respect to the DPCH channelization code, signal $y_{t,f}^{DPCH}$ at time t, for Rake-finger f can be written as follows:

$$y_{t,f}^{DPCH} = h_f u_t + e_{t,f} \qquad (1)$$

where $h_f$ is the channel for finger f, $u_t$ is the DPCH (pilot) symbol and $e_{t,f}$ is the noise on finger f with variance $\sigma_f^2$. The channel estimate, averaged over $N_{DPCH}$ dedicated pilots may be determined as follows:

$$\hat{h}_f = \frac{1}{N_{DPCH}} \sum_{k=1}^{N_{DPCH}} (u_t^p)^* y_{t,f}^{DPCH}$$

$$= h_f + \frac{1}{N_{DPCH}} \sum_{k=1}^{N_{DPCH}} (u_t^p)^* e_{t,f} \in N\left(h_f, \frac{\sigma_f^2}{N_{DPCH}}\right)$$

where p indicates that $u_t^p$ is a pilot symbol. The SIR estimate for slot k can be determined as follows:

$$SIR_k' = \sum_{f=1}^{n_k} \frac{|\hat{h}_f|^2}{\hat{\sigma}_f^2} \qquad (2)$$

where $n_k$ is the number of fingers used for SIR computation in slot k and $\hat{\sigma}_f^2$ is the estimate of the interference for finger f (obtained by scaling the CPICH interference estimate). The SIR estimate is filtered through an IIR filter (e.g., 222 or 224) in order to provide an averaged SIR estimate, as follows:

$$SIR_k = \lambda SIR_{k-1} + (1-\lambda)SIR_k' \quad (3)$$

Assuming that the SIR belongs to a stationary random process, the mean value, $E(SIR_k)$ may be as follows:

$$E(SIR_k) = \lambda E(SIR_{k-1}) + (1-\lambda)E(SIR_k'). \quad (4)$$

$$E(SIR) = \lambda E(SIR) + (1-\lambda)\sum_{f=1}^{n_k} E\left(\frac{|\hat{h}_f|^2}{\hat{\sigma}_f^2}\right)$$

Assuming that the interference estimate for each finger is ideal, i.e. $\hat{\sigma}_f^2 = \sigma_f^2$, the mean value may be provided as follows:

$$E\left(\frac{|\hat{h}_f|^2}{\hat{\sigma}_f^2}\right) \approx E\left(\frac{|\hat{h}_f|^2}{\sigma_f^2}\right) \quad (5)$$

$$= \frac{|h_f|^2 + \frac{\sigma_f^2}{N_{DPCH}}}{\sigma_f^2} = \frac{|h_f|^2}{\sigma_f^2} + \frac{1}{N_{DPCH}}$$

$$= SIR_f^{true} + \frac{1}{N_{DPCH}}$$

Inserting equation (5) into equation (4) provides the following equation:

$$E(SIR) = \lambda E(SIR) + (1-\lambda)\sum_{f=1}^{n_k}\left(SIR_f^{true} + \frac{1}{N_{DPCH}}\right) \quad (6)$$

$$= \lambda E(SIR) + (1-\lambda)SIR_k^{true} + (1-\lambda)\frac{n_k}{N_{DPCH}}$$

Equation (6) shows that the bias term in the SIR estimate depends on the number of fingers $n_k$ divided by the number of dedicated pilot symbols $N_{DPCH}$ in the transport format, which changes over time.

In some embodiments, bias may be compensated, assuming $n_k$ is constant for all slots, $n_k = n$, by subtracting the bias term after IIR filtering, as follows:

$$SIR_k = \lambda SIR_{k-1} + (1-\lambda)SIR_k' \quad (7)$$

$$SIR_k^{un\text{-}biased} = SIR_k - \frac{n}{N_{DPCH}}$$

In some other embodiments, bias may be compensated, assuming $n_k$ is varying between slots, by subtracting the bias term before IIR filtering, as follows:

$$SIR_k^{un\text{-}biased} = \lambda SIR_{k-1} + (1-\lambda)\left(SIR_k' - \frac{n_k}{N_{DPCH}}\right) \quad (8)$$

The threshold values that should be used by the TX limit detector 228 and the out-of-sync detector 226 may be determined as described below. In-sync and out-of-sync threshold values, $Q_{in}$ and $Q_{out}$, respectively, and the TX limit threshold value ($Q_{TX\_LIMIT}$) may be determined based on a relationship between SIR-symbol energy and combined TPC energy. This relationship may depend upon, for example, the number of TPC symbols $N_{TPC}$, and/or the number of RAKE fingers used to estimate the SIRs.

For a reference channel of 12.2 kbps as defined by the 3GPP specification, UE Radio Transmission and Reception (FDD), Section A.3.1, 3GPP TS 25.101 (2002–06), 2002, the slot format is 11, and a $N_{TPC}=1$ symbol (2 bits) may be used, where $N_{DPCH}=4$ symbols (8 bits).

For all other slot formats, the thresholds $Q_{in}$, $Q_{out}$, and $Q_{TX\_LIMIT}$ may be compensated for the format of the channel by, for example, scaling by a factor $1/N_{TPC}$. Accordingly, the thresholds, $Q_{in}$, $Q_{out}$, and $Q_{TX\_LIMIT}$ may be described as follows:

$$Q_{in} = \frac{Q_{in}^{12.2kbps}}{N_{TPC}}$$

$$Q_{out} = \frac{Q_{out}^{12.2kbps}}{N_{TPC}}$$

$$Q_{TX\_LIMIT} = \frac{Q_{TX\_LIMIT}^{12.2kbps}}{N_{TPC}}$$

The $N_{DPCH}$ value may only influence the bias compensation term and not the decision levels. Alternatively, these equations for thresholds, $Q_{in}$, $Q_{out}$, and $Q_{TX\_LIMIT}$ may be written to include the above-described bias compensation, and may be based on state information including, for example, whether a mobile terminal is in a soft handover mode or a compressed mode.

During a compressed mode, the spreading factor may be reduced by a factor of 2 and the DPCH $E_c$ power (where $E_c$ is the chip energy) may be doubled. Compressed mode may be handled by using slot formats ending with A and B. Compressed mode slots may use slot formats ending with a "B", for which the number of DPCH pilot symbols and number of TPC symbols have been doubled to compensate for the spreading factor reduction. Accordingly, the pilot energy and TPC bit energy per time unit may be kept about constant. The value $N_{DPCH}$ entering into the filters, see Equation (8), may be changed based on the slot format, such as has been described for the non-compressed mode case. The thresholds $Q_{in}$, $Q_{out}$, and $Q_{TX\_LIMIT}$ may be determined with $N_{TPC}$ set to $N_{TPC}$ for slot format A.

During soft-handover, the threshold values may be kept constant because of a potential loss of TPC detection performance. The in-sync threshold $Q_{in}$ may be determined from $$Q_{in} = \frac{Q_{in}^{12.2kbps}}{N_{TPC}} \cdot f(N_B)$$

where $f(\bullet)$ is a table giving the conversion gain loss of un-coherent combination of TPC symbols from $N_B$ different base stations, and may be further based on information available in the "TPC combination index", which is information received from the network 30, or based on $f(N_B)=1$.

When TX limit filter 222 responds faster to SIR changes than the sync filter 224, the filtered SIR values from the TX limit filter 222 may be noisier than those of the sync filter 224. The TX limit threshold value used by the TX limit detector 228 may be lower than the out-of-sync threshold value used by the out-of-sync detector 226 so as to reduce the occurrence of unwanted restriction of the output transmission power level due to noise fluctuations in the SIRs. For example, the TX limit threshold value may be −7 dB and the out-of-sync threshold value may be −5 dB.

When the filtered SIR values from the TX limit filter 222 are less than a TX limit threshold value, the transmission power level may be restricted to an earlier output power level of an earlier slot. In contrast, when the filtered SIR value from the sync filter 224 is less than an out-of-sync threshold, the transmitter 204 may be effectively turned-off by reducing the transmission power level to essentially zero.

In other embodiments of the present invention, a transceiver may be provided as shown in FIG. 2 except that the TX limit filter 222 may be eliminated and the filtered SIR signal from the sync filter 224 may be coupled to both the TX limit detector 228 and the out-of-sync detector 226. The threshold value of the TX limit detector 228 may be based on the threshold value of the out-of-sync detector 226. For example, the threshold that may be used to cause restriction of transmission power changes may be set a predetermined amount above the threshold used to identify an out-of-sync condition. Accordingly, a degraded received signal may satisfy the threshold for restricting power changes before it satisfies the threshold for turning off the transmitter 204.

Although embodiments of the invention have been described, for purposes of illustration only, in the context of a mobile terminal that restricts changes to its transmission power, according to various other embodiments of the present invention, a base station or another wireless device may restrict changes to its transmission power based on the operations and/or wireless transceiver described herein.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for controlling transmission power from a wireless transceiver, the method comprising:
estimating signal to interference ratios (SIRs) for a signal received from another wireless device;
identifying an out-of-sync condition between the wireless transceiver and the other wireless device based on the SIRs:
restricting change of the transmission power from the wireless transceiver based on the SIRs and when an out-of-sync condition has not been identified, wherein:
the identifying an out-of-sync condition comprises first filtering the SIRs, and at least substantially reducing the transmission power from the wireless transceiver when first filtered SIRs fall below an out-of-sync threshold; and
the restricting change of the transmission power comprises second filtering the SIRs, and restricting change of the transmission power from the wireless transceiver when the second filtered SIRs fall below a power limit threshold.

2. The method of claim 1, wherein the restricting change of the transmission power is based on the SIRs changing more than a predetermined threshold over a predetermined time.

3. The method of claim 1, wherein the out-of-sync threshold is greater than the power limit threshold.

4. The method of claim 1, wherein the out-of-sync threshold is less than the power limit threshold.

5. The method of claim 1, wherein at least one of the out-of-sync threshold and the power limit threshold is based on slot format.

6. The method of claim 1, wherein at least one of the out-of-sync threshold and the power limit threshold is based on whether the wireless transceiver is in soft handover.

7. The method of claim 1, wherein at least one of the out-of-sync threshold and the power limit threshold is based on whether the wireless transceiver is in a compressed mode.

8. The method of claim 1, wherein the second filtered SIRs more closely follow abrupt SIR changes than the first filtered SIRs.

9. The method of claim 1, further comprising removing at least a portion of bias from the SIRs.

10. The method of claim 9, wherein the removing at least a portion of bias from the SIRs is performed before the first filtering and the second filtering.

11. The method of claim 9, wherein the removing at least a portion of bias from the SIRs is performed after the first filtering and the second filtering.

12. The method of claim 1, wherein:
identifying an out-of-sync condition further comprises reducing the transmission power from the wireless transceiver to about zero when the SIRs fall below the out-of-sync threshold; and
restricting change of the transmission power from the wireless transceiver further comprises restricting change of the transmission power from the wireless transceiver when the SIRs fall below an offset threshold relative to the out-of-sync threshold.

13. The method of claim 1, further comprising removing at least a portion of bias from the SIRs.

14. The method of claim 13, the wireless transceiver including a RAKE receiver having a plurality of RAKE fingers, and wherein:
the estimating signal to interference ratios (SIRs) for a received signal is based on a number of the RAKE fingers of the RAKE receiver used to receive the signal; and
the removing at least a portion of bias from the SIRs is based on the number of RAKE fingers.

15. The method of claim 13, the wireless transceiver including a RAKE receiver, and wherein:
the estimating signal to interference ratios (SIRs) for a received pilot signal is based on a number of dedicated pilot channel symbols in the received pilot signal; and
the removing at least a portion of bias from the SIRs is based on the number of dedicated pilot channel symbols.

16. A wireless transceiver comprising:
an SIR estimator that is configured to estimate SIRs for a signal received from another wireless device;
an out-of-sync detector that is configured to identify an out-of-sync condition between the wireless transceiver and the other wireless device based on the SIRs;
a transmitter that is configured to transmit at an adjustable transmission power level;
a power limit detector that is configured to restrict a change of the transmission power level of the transmitter based on the SIRS and when an out-of-sync condition has not been identified;
an out-of-sync filter that is configured to filter the SIRs, and the out-of-sync detector is further configured to at least substantially reduce the transmission power level of the transmitter when the filtered SIRs from the out-of-sync filter fall below an out-of-sync threshold; and a transmission limit filter that is configured to filter the SIRs, and the power limit detector is configured to restrict a change of the transmission power level of the transmitter when the filtered SIRs from the out-of-sync filter fall below a power limit threshold.

17. The wireless transceiver of claim 16, wherein the power limit detector is further configured to restrict a change of the transmission power level by the transmitter based on the SIRs changing more than a predetermined threshold over a predetermined time.

18. The wireless transceiver of claim 16, wherein the out-of-sync threshold is greater than the power limit threshold.

19. The wireless transceiver of claim 16, wherein the out-of-sync threshold is less than the power limit threshold.

20. The wireless transceiver of claim 16, wherein at least one of the out-of-sync threshold and the power limit threshold is based on slot format.

21. The wireless transceiver of claim 16, wherein at least one of the out-of-sync threshold and the power limit threshold is based on whether the wireless transceiver is in soft handover.

22. The wireless transceiver of claim 16, wherein at least one of the out-of-sync threshold and the power limit threshold is based on whether the wireless transceiver is in a compressed mode.

23. The wireless transceiver of claim 16, wherein the transmission limit filter is configured so that the SIRs filtered by the transmission limit filter more closely follow abrupt SIR changes than the SIRs filtered by the out-of-sync filter.

24. The wireless transceiver of claim 16, further comprising a bias removal module that is configured to remove at least a portion of bias from the SIRs.

25. The wireless transceiver of claim 24, wherein the bias removal module is configured to remove at least a portion of bias from the SIRs before the SIRs are filtered by the out-of-sync filter and the transmission limit filter.

26. The wireless transceiver of claim 24, wherein the bias removal module is configured to remove at least a portion of bias from the SIRs after the SIRs are filtered by the out-of-sync filter and the transmission limit filter.

27. The wireless transceiver of claim 16, wherein:
the out-of-sync detector is further configured to reduce the transmission power level of the transmitter to about zero when the SIRs fall below an offset threshold relative to an out-of-sync threshold; and
the power limit detector is configured to restrict a change of the transmission power level of the transmitter when the SIRs fall below the power limit threshold.

28. The wireless transceiver of claim 16, further comprising a bias removal module that is configured to remove at least a portion of bias from the SIRs.

29. The wireless transceiver of claim 28, further comprising a RAKE receiver having a plurality of RAKE fingers, and wherein the SIR estimator is further configured to estimate SIRs for a received signal based on a number of the RAKE fingers used to receive the signal, and wherein the bias removal module is further configured to remove at least a portion of bias from the SIRs based on the number of RAKE fingers.

30. The wireless transceiver of claim 28, further comprising a RAKE receiver, and wherein the SIR estimator is further configured to estimate SIRs for a received signal based on a number of dedicated pilot channel symbols in the received pilot signal, and wherein the bias removal module is further configured to remove at least a portion of bias from the SIRs based on the number of dedicated pilot channel symbols.

31. A computer program product stored in a computer-readable medium and executable by a computer for controlling transmission power from a wireless transceiver, the computer program product comprising:
program code for estimating signal to interference ratios (SIRs) for a signal received from another wireless device;
program code for identifying an out-of-sync condition between the wireless transceiver and the other wireless device based on the SIRs; and
program code for restricting change of the transmission power from the wireless transceiver based on the SIRs and when an out-of-sync condition has not been identified, wherein:
the program code for identifying an out-of-sync condition comprises program code for first filtering the SIRs, and at least substantially reducing the transmission power from the wireless transceiver when first filtered SIRs fall below an out-of-sync threshold; and
the program code for restricting change of the transmission power comprises program code for second filtering the SIRs, and restricting change of the transmission power from the wireless transceiver when the second filtered SIRs fall below a power limit threshold.

32. The computer program product according to claim 31, further comprising program code for restricting change of the transmission power based on when the SIRs change more than a predetermined threshold over a predetermined time.

* * * * *